UNITED STATES PATENT OFFICE.

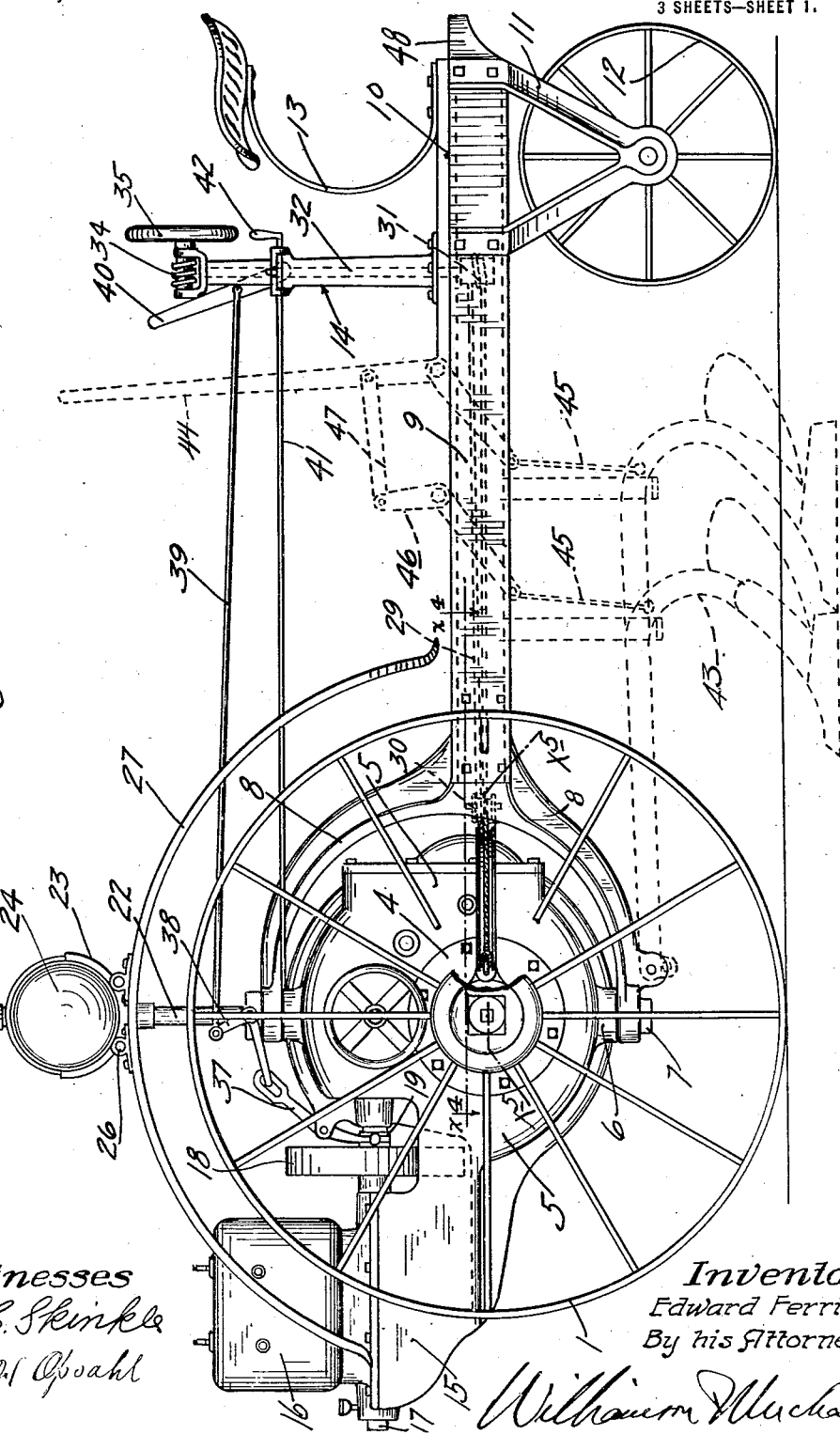

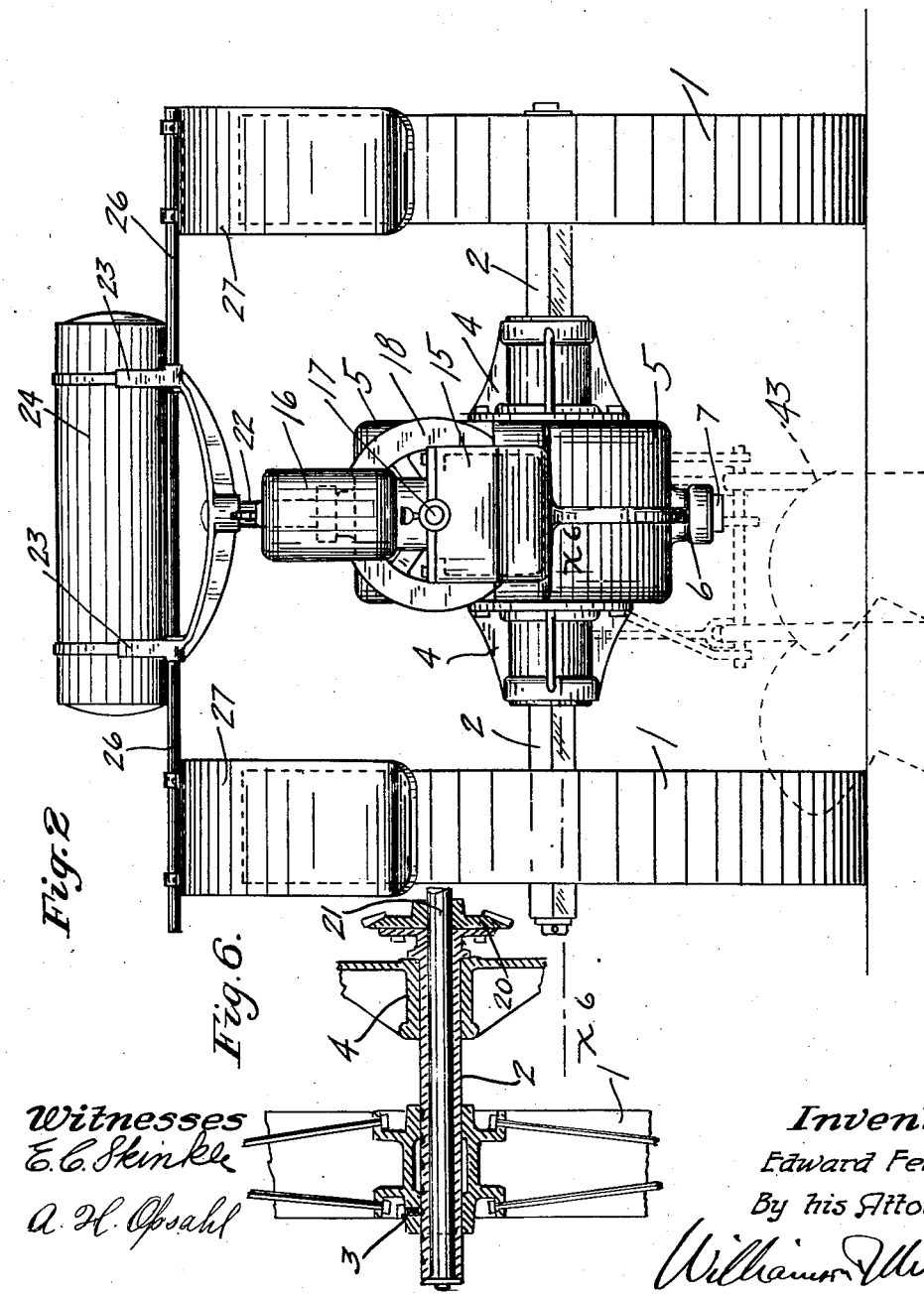

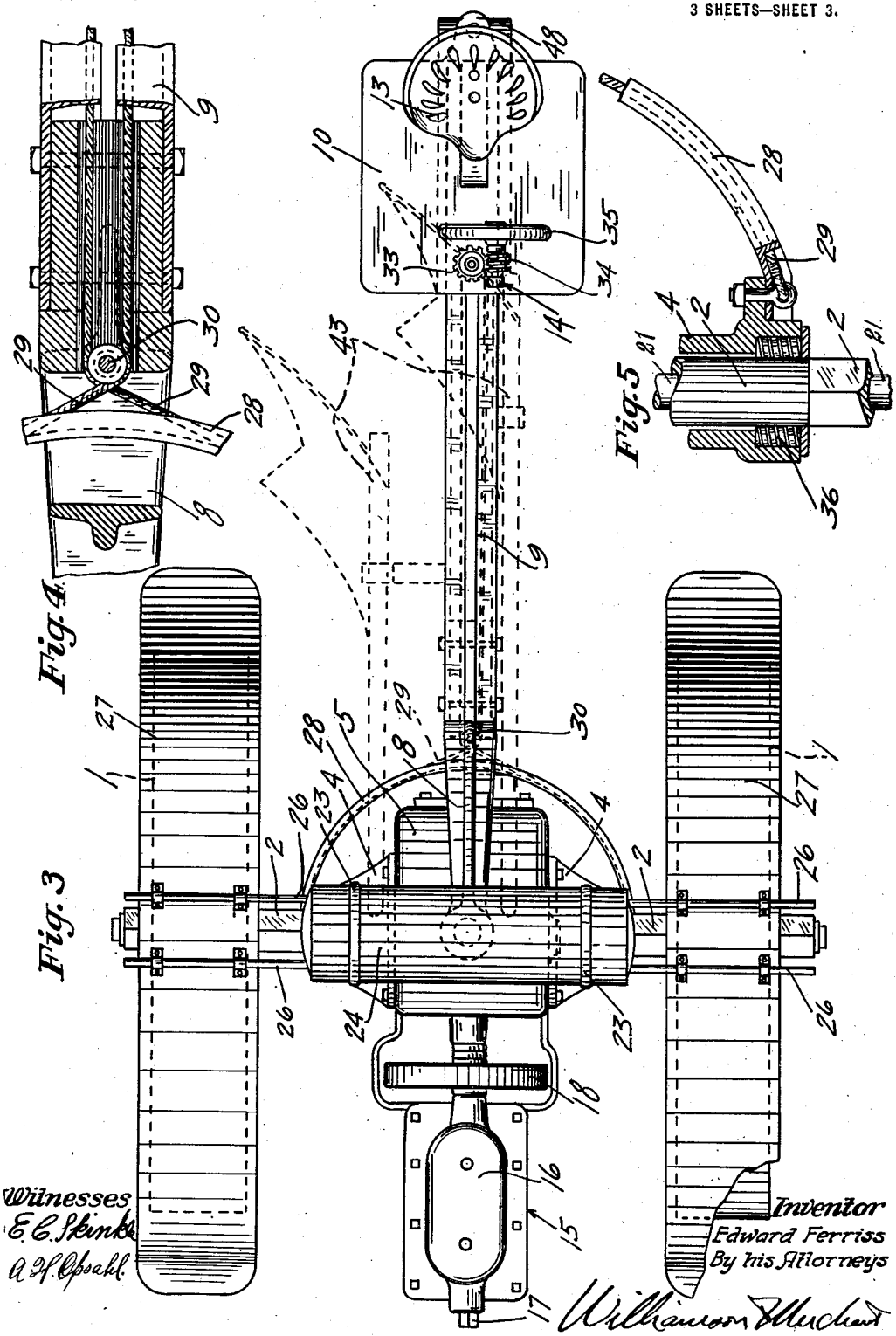

EDWARD FERRISS, OF MINNEAPOLIS, MINNESOTA, ASSIGNOR TO MINNESOTA FARM TRACTOR COMPANY, OF MINNEAPOLIS, MINNESOTA, A CORPORATION OF SOUTH DAKOTA.

TRACTOR.

1,219,930.　　　　　　　Specification of Letters Patent.　　　Patented Mar. 20, 1917.

Application filed December 20, 1915.　Serial No. 67,706.

*To all whom it may concern:*

Be it known that I, EDWARD FERRISS, a citizen of the United States, residing at Minneapolis, in the county of Hennepin and State of Minnesota, have invented certain new and useful Improvements in Tractors; and I do hereby declare the following to be a full, clear, and exact description of the invention, such as will enable others skilled in the art to which it appertains to make and use the same.

This invention relates to tractors and has for its particular object to provide a small size tractor of extremely simple construction, high efficiency and low cost. Generally stated, the invention consists of the novel devices and combinations of devices hereinafter described and defined in the claims.

In the accompanying drawings which illustrate the invention, like characters indicate like parts throughout the several views.

Referring to the drawings:

Figure 1 is a left side elevation of the improved tractor;

Fig. 2 is a rear elevation of the tractor;

Fig. 3 is a plan view of the same;

Fig. 4 is a fragmentary section taken on the line $x^4\ x^4$ of Fig. 1;

Fig. 5 is a fragmentary section taken on the line $x^5\ x^5$ of Fig. 1;

Fig. 6 is a fragmentary section taken on the line $x^6\ x^6$ of Fig. 2.

This improved tractor comprises two relatively large front traction wheels and a relatively small centrally located rear steering wheel. The said front traction wheels 1 are rigidly, but adjustably secured on heavy external square sleeves 2, by means of set screws 3 or other suitable devices. The sleeves 2 are axially alined and have cylindrical portions journaled in bearings 4 that are rigidly, but detachably bolted to the side plates of a heavy gear housing 5. This gear housing 5 has axially alined upper and lower bosses 6 to which, by means of heavy machine screws 7, the upper and lower ends of the pronged head 8 of a reach bar 9 are pivoted. To the rear end of the reach bar 9 is secured an operator's platform 10 and a wheel bracket 11, to the lower portion of which latter, the centrally located rear steering wheel 12 is journaled. Rigidly secured on the platform 10 is the operator's seat 13 and an upright bearing post 14.

The gear casing 5 is formed with a forwardly projected shelf-like portion 15 to which the base of the cylinder casting of an internal combustion engine 16 is bolted, with its shaft 17 extending longitudinally of the tractor and provided at its rear end with a fly wheel 18, which, by means of an ordinary friction clutch 19, is adapted to be connected, to the sleeves 2, through suitable reversible variable speed transmission mechanism including a differential gear, all of which parts may be of well known construction. For the purposes of this case, it is only desirable to note (see particularly Fig. 6) that the independently rotatable beveled gears 20 of the differential are bolted, or otherwise rigidly secured to the inner ends of the respective sleeves 2, so that the said two sleeves will be independently driven. The sleeves 2 are hollow, and a heavy axle 21 is extended loosely therethrough, and through the said sleeves, being held only against endwise movements in respect thereto. This axle greatly reinforces the sleeves and reduces the strain between the same and their bearings 4. The gear housing 5 is a rigid closed structure which completely incases the gearing so that the latter may run in oil, and furthermore, it, in itself, and without a reinforcing framework, constitutes the main frame element of the tractor.

On its top, the gear casing 5 is provided with a centrally located heavy post 22 having at its upper end a forked head 23 that supports the gasolene supply tank 24 and a pair of parallel transversely extended rods 26. Rigidly but slidably mounted on the ends of the rods 26, for movements toward and from each other, are segmental wheel guards 27, which, by proper adjustment, may be kept always over the coöperating traction wheels 1.

To steer the tractor, the gear casing 5 and front axle must be oscillated, in respect to the reach 9, or stated in another way, the reach 9 must be oscillated in respect to the said gear casing and front axle. This may be accomplished by various different devices, but as shown, the said relative movement is accomplished as follows:

The numeral 28 indicates a grooved segment rigidly secured to the bearings 4 on the sides of the gear casing 5 and extended rearward of the said gear casing. Cables 29 are attached to the forked extensions of the segments 28, are passed over the same to the center of the reach 9, and are thence crossed and passed over the opposite sides of guide sheaves 30 journaled to the front end of the said reach. Here it may be stated that the said reach 9 is made hollow, being as shown, made up of laterally spaced channel beams turned with their flanges facing each other. From the sheaves 30, the cables 29 are brought rearward and are reversely wound on the small drum 31 secured to the lower end of an upright steering shaft 32 journaled in the bearing post 14. Of course, the said cables 29 may be a single cable with the intermediate portion given several coils around the drum 31. At its upper end, the shaft 32 has a rigidly secured worm gear 33 that meshes with a worm 34 formed on the shaft of a steering wheel 35 journaled to the upper end of the post 14. As shown in Fig. 5, roller bearings 36 are interposed between the bearings 4 and cylindrical portions of the sleeves 2. For operating the clutch 19, and to thereby connect the engine to the transmission mechanism, or to disconnect the same therefrom, at will, the movable member of the said clutch is subject to a shipper lever 37, is pivoted to the top of the gear housing 5, and is connected to a bell crank 38, which, as shown, is pivoted on top of the housing 5 and is connected by a long rearwardly extended rod 39 to an operating lever 40 pivoted to the post 14 and located within reach from the seat 13. The numeral 41 indicates a rod mounted on top of the housing 5 and in the bearing on the post 14 and provided with a hand piece 42 which is within reach from the seat 13. This rod, through connections not shown, would control the throttle valve, and hence, the speed and power of the engine.

This improved tractor may be used to draw various different vehicles or farm implements, but is especially adapted for drawing two or three plows. When used to draw plows, the plows may be attached in different ways. The dotted lines in Figs. 1, 2 and 3 indicate a very convenient way of attaching the plows, to-wit, the beams of the plows 43 would be attached to lugs on the lower prongs of the reach head 8, and they will be raised and lowered from a lever 44 pivoted to the platform 10, the one through a simple lifting link 45 and the other through a link 45, bell crank 46 and link 47.

With this arrangement above described, all of the gears of the transmission mechanism are inclosed within the housing 5 and protected from dirt and dust, and if desired, made to run in oil. The said housing forms a very strong framework and rigid support for the engine; and the manner of connecting the forked head of the reach to the upper and lower portions thereof gives very rigid and well braced connection between the housing and reach, especially adapted for resisting strains in a vertical plane.

By lateral adjustments of the traction wheel, they may be spaced properly for various different kinds of work. For example, the inside traction wheel may be arranged to run in the furrow made by the last plow on a previous trip, or it may be adjusted farther inward so that it will run upon the unplowed ground directly in front of the inside plow. This is an important feature. The illustrated location of the gasolene tank throws the entire weight thereof on the traction wheels and the forward location of the engine and its support not only throws the weight thereof on the traction wheels, but balances a rearwardly extended portion of the reach also on the traction wheels. This, as is evident, makes a relatively very great proportion of the total weight of the tractor effective on the traction wheels. As shown, the reach 9, in its extreme rear end, is formed with a perforated lug 48, to which any vehicle, implement, or machine to be drawn, may be attached.

The tractor described has very few parts, is strong, durable, of small cost and highly efficient.

What I claim is:

1. In a tractor, the combination with laterally spaced wheels and an axle therefor, of a closed gear housing carried by said axle, said housing constituting the main frame element, a reach having a forked end embracing the upper and lower portions of said housing and pivotally connected thereto, and a wheel supporting the rear end of said reach.

2. In a tractor, the combination with laterally spaced wheels and an axle therefor, of a closed gear housing carried by said axle, said housing constituting the main frame element, a reach having a forked end embracing the upper and lower portions of said housing and pivotally connected thereto, a wheel supporting the rear end of said reach, and steering connections between said reach and housing for oscillating, one horizontally in respect to the other.

3. In a tractor, the combination with laterally spaced wheels and an axle therefor, of a closed gear housing carried by said axle, said housing constituting the main frame element, a reach having a forked end embracing the upper and lower portions of said housing and pivotally connected thereto, a wheel supporting the rear end of said reach, said gear housing having an integral forwardly projected bracket, and an internal combustion engine mounted on said bracket for driving said traction wheels, the weight of said engine counterpoising in part the weight of the said reach and parts connected thereto.

4. In a tractor, the combination with an axle comprising a shaft and axially alined driving sleeves mounted thereon and having angular exterior cross sections, of traction wheels mounted on the angular exterior surfaces of said driving sleeves with freedom for lateral adjustments.

5. In a tractor, the combination with laterally spaced wheels and an axle therefor, of a closed gear housing carried by said axle and having rigidly secured laterally projecting sleeve-like bearings in which the said rear axle is journaled, and a reach having a forked end embracing the upper and lower portions of said housing and pivotally connected thereto.

6. In a tractor, the combination with laterally spaced wheels and an axle therefor, of a closed gear housing carried by said axle, said housing constituting the main frame element, a reach having a forked end embracing the upper and lower portions of said housing and pivotally connected thereto, a wheel supporting the rear end of said reach, and a gasolene tank located above and supported from said housing.

7. In a tractor, the combination with an axle and laterally spaced wheels mounted thereon for lateral adjustment toward and from each other, and mud guards overlying said wheels and capable of lateral adjustment toward and from each other and corresponding to lateral adjustment of said wheels.

In testimony whereof I affix my signature in presence of two witnesses.

EDWARD FERRISS.

Witnesses:
HARRY D. KILGORE,
F. D. MERCHANT.